(12) United States Patent
Whiteside

(10) Patent No.: US 11,554,971 B2
(45) Date of Patent: Jan. 17, 2023

(54) VARIABLE FLOW ADJUSTER FOR GREASE SEPARATOR

(71) Applicant: MI-FAB Manufacturing, LLC, Chicago, IL (US)

(72) Inventor: Michael J. Whiteside, Chicago, IL (US)

(73) Assignee: MI-FAB Manufacturing, LLC, Chicago, IL (US)

( * ) Notice: Subject to any disclaimer, the term of this patent is extended or adjusted under 35 U.S.C. 154(b) by 0 days.

(21) Appl. No.: 17/232,845

(22) Filed: Apr. 16, 2021

(65) Prior Publication Data

US 2022/0332603 A1 Oct. 20, 2022

(51) Int. Cl.
*E03F 5/16* (2006.01)
*C02F 1/40* (2006.01)
*C02F 101/32* (2006.01)

(52) U.S. Cl.
CPC ............. *C02F 1/40* (2013.01); *E03F 5/16* (2013.01); *C02F 2101/32* (2013.01); *C02F 2307/08* (2013.01)

(58) Field of Classification Search
CPC .... C02F 1/40; C02F 2101/32; C02F 2307/08; C02F 2209/42; C02F 2209/02; E03F 5/16; G01F 23/2928; G01F 23/2962; G01B 11/0608; G01B 17/02
USPC .................................................. 210/86, 703
See application file for complete search history.

(56) References Cited

U.S. PATENT DOCUMENTS

| | | | | |
|---|---|---|---|---|
| 3,401,842 A | * | 9/1968 | Morrison | B05B 7/2481 220/300 |
| 6,058,526 A | * | 5/2000 | Parisi | E03C 1/23 4/287 |
| 9,062,510 B1 | * | 6/2015 | Cassel | E21B 34/02 |
| 2002/0074369 A1 | * | 6/2002 | Forsman | A45F 3/16 224/680 |
| 2021/0239247 A1 | * | 8/2021 | Brown | B01D 21/0006 |

FOREIGN PATENT DOCUMENTS

KR 100448264 B1 * 9/2004 .............. C02F 1/00

* cited by examiner

*Primary Examiner* — Nam X Nguyen
*Assistant Examiner* — Ekandra S. Miller-Cruz
(74) *Attorney, Agent, or Firm* — Phillips Lytle LLP; David L. Principe

(57) ABSTRACT

A grease or oil separator system that includes a grease interceptor body with a variable flow control assembly. The grease interceptor system is a large tank with an inlet for wastewater and a downstream outlet for passing the wastewater minus separated grease and oil into a sewer system. Inside the tank, the grease floats to the top so that it can be removed through an opening in the top wall that provides an access port for clean out. The pickup for the outlet is located toward the bottom of the tank near the bottom wall so that only water separated from the grease flows into the sewer system. The variable flow control assembly varies the size of an opening in a conduit inside the interceptor body. Varying the size of the opening controls the flow from the inlet into the tank.

14 Claims, 5 Drawing Sheets

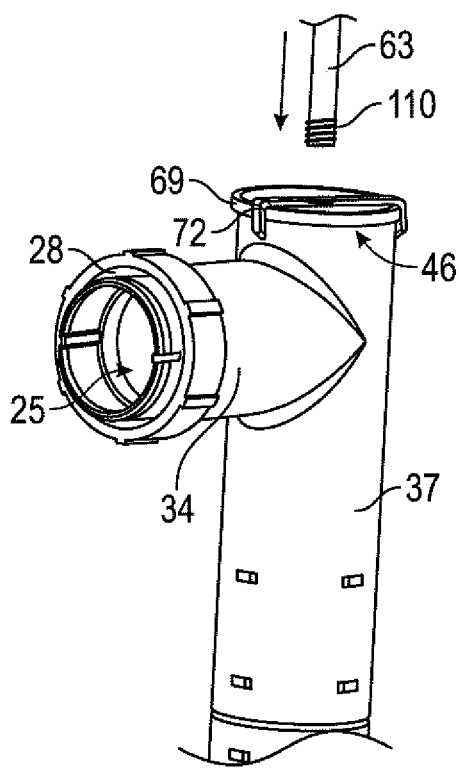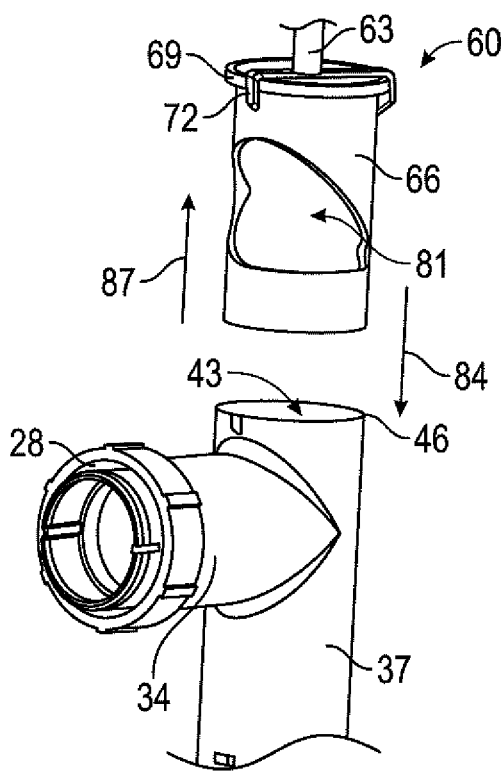
FIG. 2A
FIG. 2B
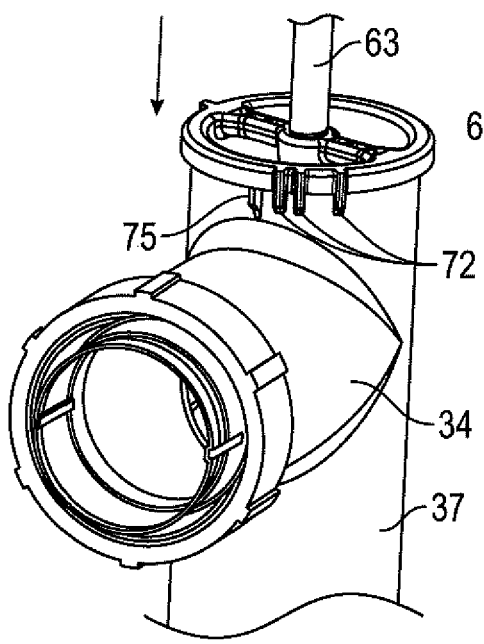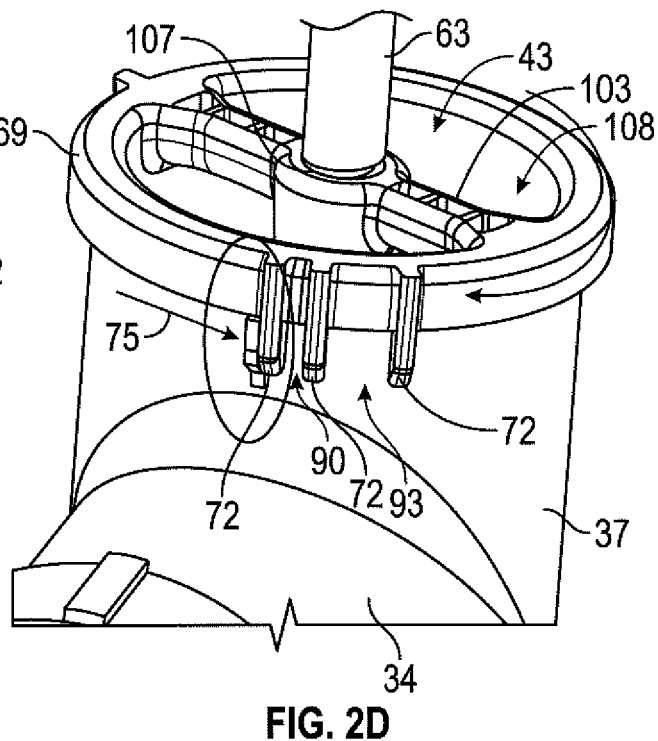
FIG. 2C
FIG. 2D

VARIABLE FLOW ADJUSTER FOR GREASE SEPARATOR

TECHNICAL FIELD

The present invention relates generally to the field of plumbing, and more particularly to a system for providing a variable flow adjuster for use with a grease interceptor in a drain line.

BACKGROUND ART

Commercial food service establishments, such as restaurants, produce considerable amounts of organic material in their waste or drainage water which often includes high levels of grease or oil. Such materials can clog or adversely affect public wastewater and sewer systems. Most jurisdictions therefore require that such grease and oil be removed from the wastewater at the commercial establishment before it is permitted to enter the wastewater system. To effect such removal, the commercial establishment will typically install a grease interceptor on its wastewater outlet line from its food preparation area, such as its kitchen. The purpose of the grease interceptor is to permit the free flow of wastewater, while capturing any grease or oils contained in the water. The process of grease interception involves the separating and retaining of globules of grease, fats and oils from wastewater as it passes through the grease interceptor. Typically the oily wastewater passes into the grease interceptor at one end and as the water flows through the interceptor it is slowed down, allowing the lighter than water components, such as grease and oil, to rise within the water accumulating in an upper layer in the interceptor. A fluid outlet from the grease interceptor is positioned below the level of the grease layer to permit substantially grease free wastewater to pass through the interceptor. In this way, the grease is collected in the grease interceptor and it may be periodically removed from the top of the grease interceptor. The grease is then disposed of as solid waste in accordance with local regulations, for example, by removal to landfill sites.

BRIEF SUMMARY OF THE INVENTION

With parenthetical reference to the corresponding parts, portions or surfaces of the disclosed embodiment, merely for the purposes of illustration and not by way of limitation, the present invention provides a grease or oil separator system (10) that includes a grease interceptor body (13). The grease interceptor system (60) is a large tank with an inlet (25) for wastewater and a downstream outlet (31) for passing the wastewater into a sewer system. Inside the tank the grease floats to the top so that it can be removed through an opening (20) in the top wall (19) that provides an access port. The pickup for the outlet (31) is located toward the bottom of the tank near the bottom wall (22) so that only water separated from the grease flows into the sewer system.

The grease interceptor body (13) has a bottom wall (22), at least one sidewall (16), a top wall (19), and at least one opening (20) in the top wall (19).

A first conduit (34) is disposed in fluid communication with the inlet (25). The first conduit (34) extends inward toward the center of the grease interceptor body (13). The first conduit (34) intersects with a second conduit (37). The second conduit (37) has a first end (46) and a second end (49) disposed opposite from the first end (46). The second conduit (37) has a first opening (40) in a sidewall having a diameter approximately equal to an outside diameter of the first conduit (34) such that a continuous passage way from the first conduit (34) to the second conduit (37) is formed at the intersection. The second conduit (37) has a second opening (43) disposed at the first end (46) and a third opening (52) disposed at the second end (49).

A variable flow adjuster body (66) has an outside diameter slightly smaller than the inside diameter of the second conduit (34) such that the variable flow adjuster body (66) is configured and arranged to slide within the second conduit (34). The flow adjuster body (66) has a sidewall with a flow control opening (81) defined therein. The flow control opening (81) is configured to rotate into at least one position where a portion of the variable flow adjuster body (66) disposed adjacent to the flow control opening (81) obstructs a portion of the first opening (40) such that a variable size opening (100) between the first conduit (34) and the inside of the variable flow adjuster body (66) is formed. The variable flow adjuster body (66) has a larger diameter section (69) at the top forming a shoulder (78) adjacent to the sidewall. The shoulder (78) is configured and arranged to rest on the first end (46) of the second conduit (37) when the variable flow adjuster body (66) is inserted into the second conduit (37).

A handle assembly (63) extends from the variable flow adjuster body (66) and is configured and arranged such that the variable flow adjuster body (66) can be inserted and removed from the second conduit (37) and rotated relative thereto.

Insertion of the variable flow adjuster body (66) into the second conduit (37) until the larger diameter section (69) engages with the first end (46) of the second conduit (37) and rotation of the variable flow adjuster body (66) relative to the second conduit (37) causes the flow control opening (81) in the flow adjuster body (66) to adjust the variable size opening (100) between the first conduit (37) and the inside of the variable flow adjuster body (66).

BRIEF DESCRIPTION OF THE DRAWINGS

FIG. 2A is a perspective view of a portion of the variable flow adjustor assembly of the present invention.

FIG. 2B is a perspective view of the variable flow adjustor assembly being positioned in the second conduit.

FIG. 2C is a perspective view of the variable flow adjustor assembly installed in a first position relative to the second conduit.

FIG. 2D is an enlarged perspective view of the variable flow adjustor assembly installed in a second position relative to the second conduit.

DESCRIPTION OF THE PREFERRED EMBODIMENTS

Figure 1:
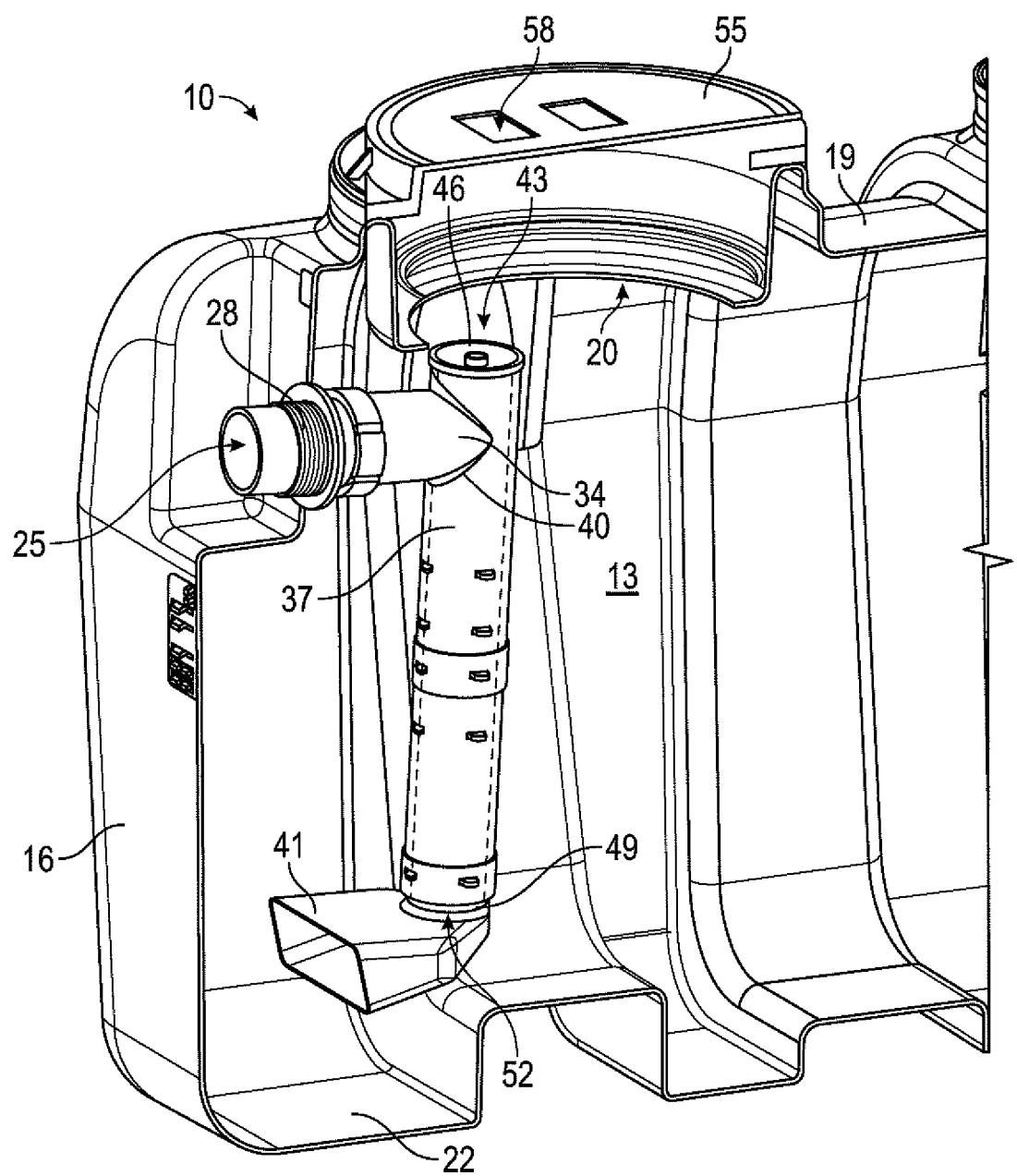
FIG. 1 is a partial cross-section view of the grease/oil separator of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIG. 1 thereof, this invention provides a grease interceptor system 10 that includes a grease interceptor body 13 having a sidewall 16, a top wall 19, and a bottom wall 22. The side wall 16 has an inlet 25 that may be provided with a fitting 28 for connecting to a line (not shown) that conveys waste water from a source such as a restaurant. The waste water may contain grease and oils that need to be separated through an opening 20 in the top wall 19 before the water enters the sewer system which may be disposed in fluid communication with an outlet 31 (FIGS. 4, 5) of the grease interceptor system 10.

The inlet 25 may be disposed substantially horizontally and may lead to a first conduit 34 extending inward into the body 13. The first conduit 34 may lead to a second conduit 37. The second conduit 37 may be oriented vertically as shown in the figure. The first conduit 34 may intersect with the second conduit 37 at a ninety degree angle. The intersection of the two conduits may be arranged such that a first opening 40 in the cylindrical wall forming the second conduit 37 is approximately equal to the outer diameter of the first conduit 34 such that one hundred percent of the flow from the first conduit 34 normally enters the second conduit 37.

The second conduit 37 may be provided with a second opening 43 at the first end 46. The second opening 43 may be bordered by the cylindrical wall forming the second conduit 37. A diffuser 41 may be attached at a second end 49 of the second conduit 37 disposed opposite from the first end 46. The diffuser 41 is disposed in fluid communication with a third opening 52 at the second end 49 of the second conduit 37 and may be configured and arranged to spread out the incoming flow and to direct it outward away from the center of the grease interceptor body 13 and toward the side wall 16. The outward direction of the flow increases the time that the waste water is resident in the grease interceptor system 10 before it passes to the outlet 31 (FIGS. 4, 5) on the other side of the body 13.

Figure 4:
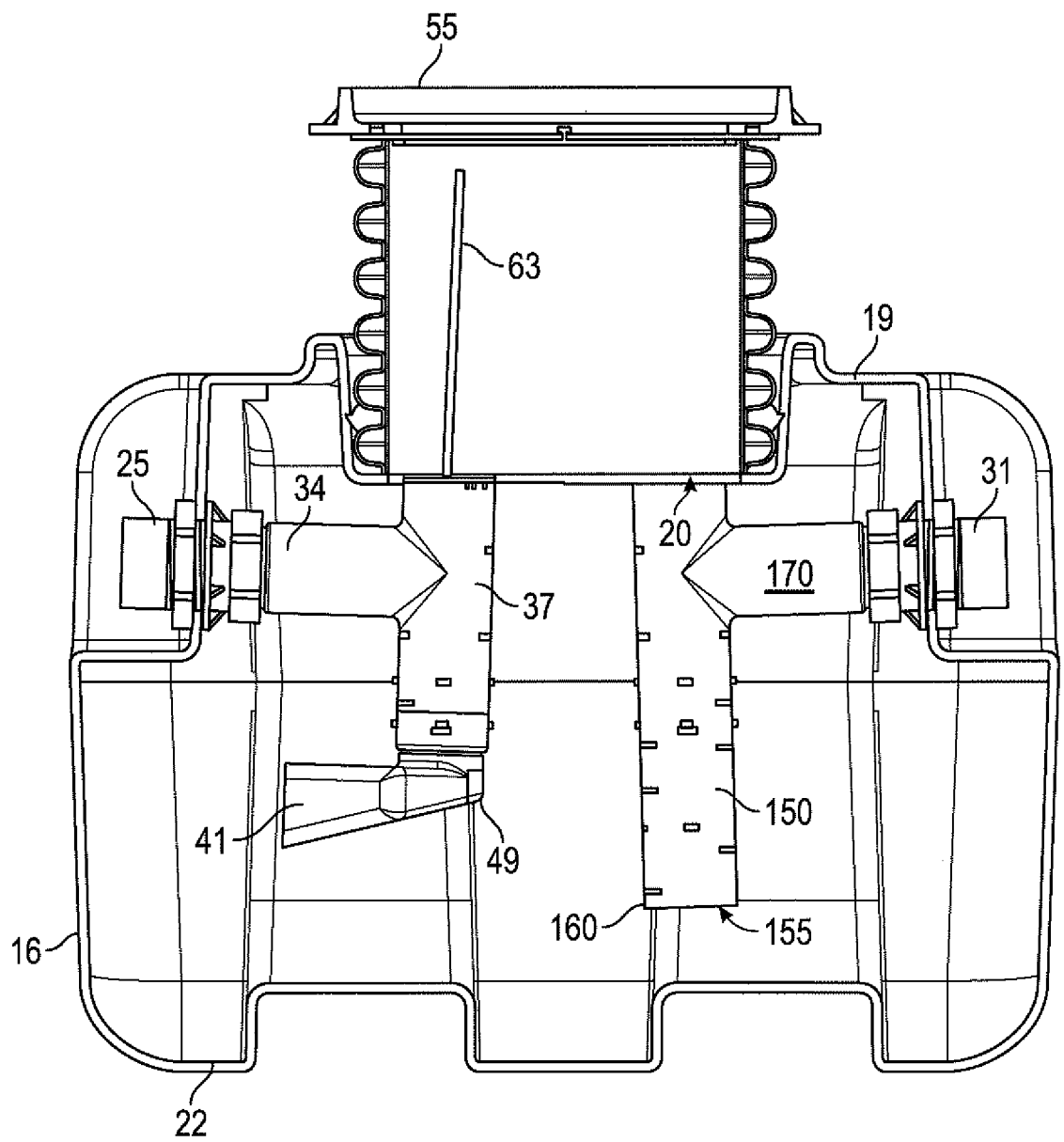
FIG. 4 is a cross-sectional view of a grease/oil separator system of the present invention.
Figure 5:
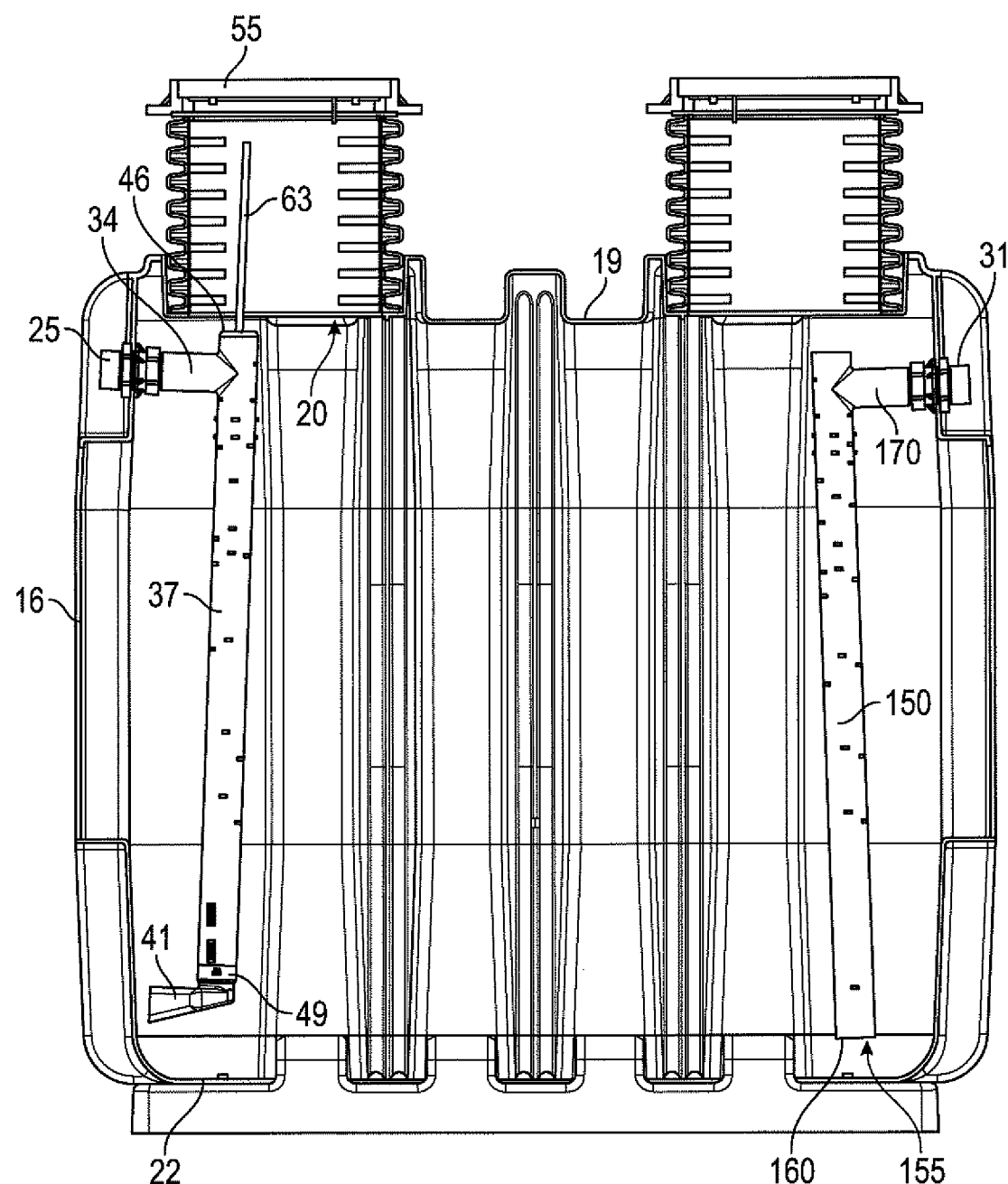
FIG. 5 is a cross-sectional view of an alternate embodiment of the grease/oil separator system of the present invention.

The increased residence time provides for the grease and solids which are lighter than the water to float upward in the grease interceptor system 10. As shown in FIGS. 4 and 5, the pickup point for the conduit 150 leading to the outlet 31 is configured and arranged to be at a lower height within the grease interceptor body 13 to only draw wastewater and not grease.

The opening 20 in the top wall 19 of the grease interceptor system 10 is provided with a removable cover 55 that provides access for periodically cleaning out the grease and solids for proper disposal. The removable cover 55 may also provide at least one opening 58 for access to a variable flow control device 60 (best shown in FIG. 2B).

Turning to FIG. 2A, the variable flow control device 60 may be provided with a handle assembly 63 that attaches to a variable flow adjuster body 66 (FIG. 2B). As shown, the variable flow adjuster body 66 has a larger diameter section 69 that rests on the first end 46 of the second conduit 37. The larger diameter section 69 may have tabs 72 extending downward therefrom. The tabs 72 may be configured and arranged to engage with projections 75 on the outside surface of the second conduit 37 as described herein.

Turning to FIG. 2B, the variable flow control device 60 is shown removed from the second conduit 37. The variable flow control device 60 includes the variable flow adjuster body 66 which has a first diameter 67. The larger diameter section 69 is located at the top of the device 60 and forms a shoulder 78 (FIG. 3A) for resting the flow control device 60 on the first end 46 of the second conduit 37. The variable flow adjuster body 66 has a flow control opening 81 in the side wall. The flow control opening 81 may be curved and may be larger on the left side than it is on the right side. The variable flow adjuster body 66 is sized such that it fits inside the second conduit 37 such that the outer diameter of the variable flow adjuster body 66 is slightly less than the inner diameter of the second conduit 37. Accordingly, the variable flow adjuster body 66 fits into the first end 46 of the second conduit 37 and slides downward until the larger diameter section 69 engages with the first end 46 of the second conduit 37. The larger diameter section 69 prevents the variable flow adjuster body 66 from sliding all the way through the inside of the second conduit 37. The handle assembly 63 provides for inserting and removing the variable flow control device 60 in the direction of arrows 84 and 87. In addition, the handle assembly 63 provides for rotating the position of the flow control device 60 relative to the second conduit 37 as described in greater detail herein. The handle assembly 63 may be removably attached to the variable flow adjuster body 66 by a threaded connection or other means as will be evident to persons of ordinary skill in the art based on this disclosure.

In FIG. 2C, the flow control device 60 is seated on the first end 46 of the second conduit 37 with the shoulder 78 formed by the larger diameter section 69 at the top of the variable flow adjuster body 66 resting on the first end 46 of the second conduit 37. As shown, the larger diameter section 69 may be provided with the plurality of tabs 72 extending downward approximately parallel to the outside surface of the wall forming the second conduit 37. The outside surface of the wall may be provided with the projection 75 configured and arranged to provide an obstruction to engage with the tabs 72 extending from the larger diameter section 69 of the flow control device 60. In the position shown in FIG. 2C, there is a group of three tabs 72 with a first gap 90 (FIG. 2D) between the first two tabs 72 and a larger gap 93 (FIG. 2D) between the two tabs 72 and a third tab 72. The tab 72 on the left side of the row of tabs 72 is disposed near the projection 75 but is not making contact and therefore the body 66 can be further rotated by the handle assembly 63.

Turning to FIG. 2D, the body 66 has been rotated into a position where the outside surface of the leftmost tab 72 engages with the projection 75. This configuration corresponds to the third configuration shown in FIG. 3D herein. As shown, the flow control device 60 may have an open top with a bridge member 103 extending across the opening 108. The bridge member 103 may be provided with an opening 107 having a set of threads configured to engage with threads 110 (FIG. 2A) at the end of the handle assembly 63.

Figure 3A:
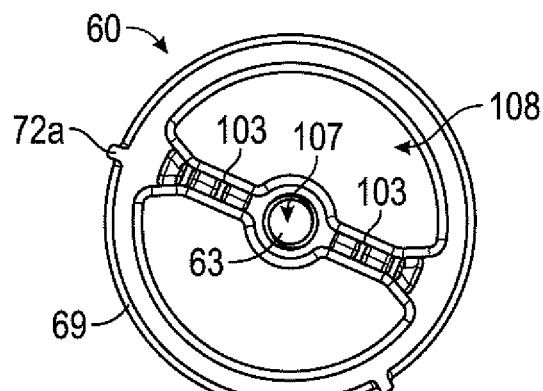
FIG. 3A is a top plan view of the variable flow adjustor assembly.
Figure 3B:
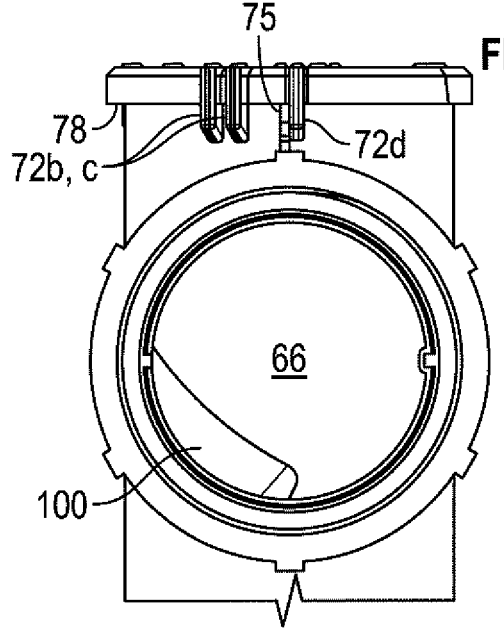
FIG. 3B is a front elevation view of the first and second conduit with the variable flow adjustor assembly showing the flow control opening in a first configuration.
Figure 3C:
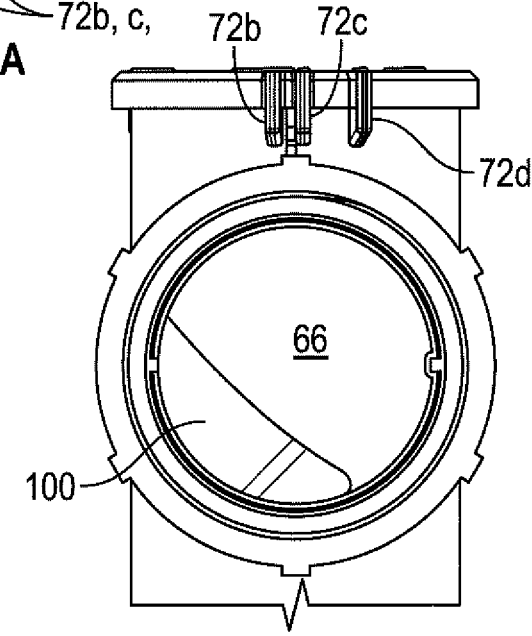
FIG. 3C is a front elevation view of the first and second conduit with the variable flow adjustor assembly showing the flow control opening in a second configuration.
Figure 3D:
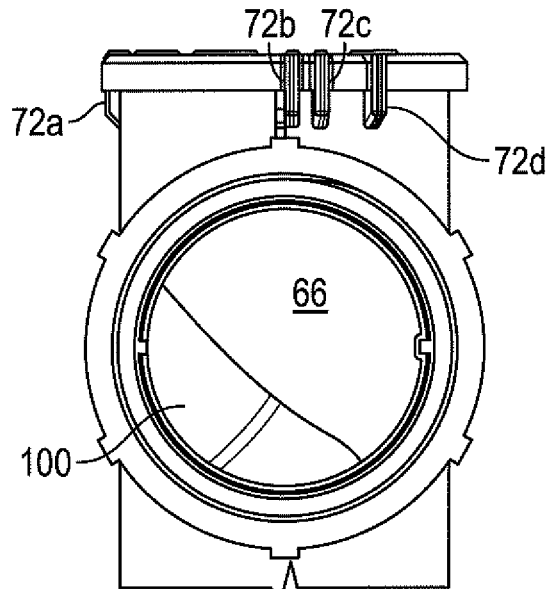
FIG. 3D is a front elevation view of the first and second conduit with the variable flow adjustor assembly showing the flow control opening in a third configuration.
Figure 3E:
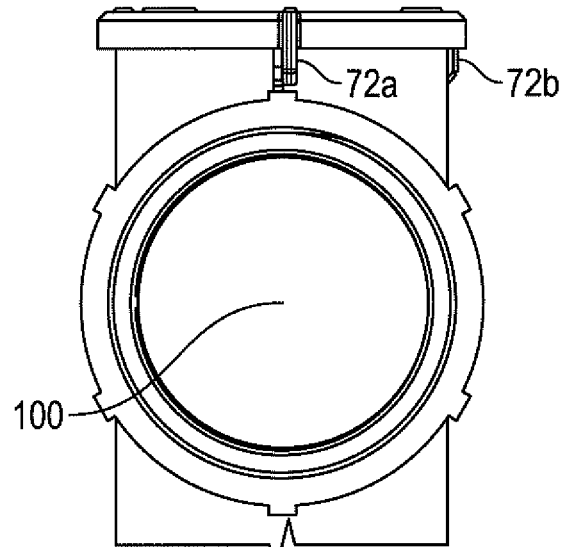
FIG. 3E is a front elevation view of the first and second conduit with the variable flow adjustor assembly showing the flow control opening in a fourth configuration.

In FIG. 3A, a top view of one embodiment of the flow control device 60, shows a configuration of tabs 72a, 72b, 72c, and 72d disposed around the periphery of the larger diameter section 69. As shown in FIGS. 3B-3E, the position of the tabs 72a-d relative to a projection 75 on the second conduit 37 provides for at least four different configurations corresponding to different flow settings. By varying the position of the variable flow adjuster body 66 relative to the second conduit 37, the position of the flow control opening 81 in the variable flow adjuster body 66 relative to the first opening 40 in the second conduit 37 forms a variable size opening 100. The variable size opening 100 provides for flow control between the first conduit 34 and the inside of the variable flow adjuster body 66 which is disposed in fluid communication with the second conduit 37. As an example, the configuration shown in FIG. 3B with tab 72d abutting with the projection 75 may create an opening 100 corresponding to a flow rate of 50 gallons per minute ("GPM"). FIG. 3C in which the projection 75 is disposed between tabs 72b and 72c may create an opening 100 corresponding to a flow rate of 75 GPM. FIG. 3D and FIG. 3E show additional settings that may correspond to flow rates of 100 GPM and 250 GPM (wide open configuration).

Turning to FIGS. 4 and 5, the full width of a pair of embodiments of the grease interceptor system 10 of the present invention are shown. In FIGS. 4 and 5, the conduit system for the outlet 31 is shown. A third conduit 150 has an opening 155 at a first end 160. The opening 155 is positioned below the height of the diffuser 41 to provide a pickup for waste water. The distance from the diffuser 41 and the height of the opening 155 below the diffuser 41 are designed to provide additional time and space for the grease and oil to rise above the opening 155 to prevent grease and or oil from entering the third conduit 150 that is in fluid communication with the outlet 31. The third conduit 150 may be disposed in fluid communication with a fourth conduit 170 leading to outlet 31. The outlet 31 is in fluid communication with a sewer system and the purpose of the grease interceptor is to prevent grease, fats, and oils from reaching the outlet 31.

The present invention contemplates that many changes and modifications may be made. Therefore, while the presently-preferred form of the variable flow adjuster for a grease interceptor system has been shown and described, and several modifications and alternatives discussed, persons skilled in this art will readily appreciate that various additional changes and modifications may be made without departing from the spirit of the invention, as defined and differentiated by the following claims.

The invention claimed is:

1. A grease interceptor system, comprising: a grease interceptor body having an inlet, an outlet, a bottom wall, at least one grease interceptor body sidewall, a top wall, and at least one opening in the top wall; a first conduit disposed in fluid communication with the inlet, the first conduit extending inward toward the center of the grease interceptor body, the first conduit intersecting with a second conduit having a first end and a second end disposed opposite from the first end, the second conduit having a first opening in a second conduit sidewall, the second conduit disposed in fluid communication with the first conduit through the first opening, the second conduit having a second opening disposed at the first end and a third opening disposed at the second end; and, a variable flow adjuster body having an outside diameter slightly smaller than the inside diameter of the second conduit such that the variable flow adjuster body is configured and arranged to slide within the second conduit, the variable flow adjuster body having a variable flow adjuster body sidewall with a flow control opening defined therein, the flow control opening configured to rotate into at least one position where a portion of the variable flow adjuster body adjacent to the flow control opening obstructs a portion of the first opening such that a variable size opening between the first conduit and the inside of the variable flow adjuster body is formed; the variable flow adjuster body has a larger diameter section at the top of the variable flow adjuster body forming a shoulder adjacent to the variable flow adjuster body sidewall, the shoulder configured and arranged to rest on the first end of the second conduit when the variable flow adjuster body is inserted into the second conduit wherein the larger diameter section has a plurality of tabs extending therefrom, each tab corresponding to a flow control setting; and, means for rotating the variable flow adjuster body.

2. The grease interceptor system of claim 1, wherein the second conduit has at least one projection extending from an outer surface, the projection configured to engage with one of the plurality of tabs.

3. The grease interceptor system of claim 1, wherein the rotating means comprises a handle assembly extending from the variable flow adjuster body and configured and arranged to control insertion of the variable flow adjuster body into the second conduit and to control removal from the second conduit and rotation relative thereto.

4. The grease interceptor system of claim 3, wherein the handle assembly is elongate.

5. The grease interceptor system of claim 2, wherein the variable flow adjuster body is configured and arranged to rotate until the at least one tab engages with the projection on the outer surface of the second conduit.

6. A grease interceptor system, comprising: a grease interceptor body having an inlet, an outlet, a bottom wall, at least one grease interceptor body sidewall, a top wall, and at least one opening in the top wall; a first conduit disposed in fluid communication with the inlet, the first conduit extending inward toward the center of the grease interceptor body, the first conduit intersecting with a second conduit having a first end and a second end disposed opposite from the first end, the second conduit having a first opening in a second conduit sidewall having a diameter approximately equal to an outside diameter of the first conduit such that a continuous passage way from the first conduit to the second conduit is formed at the intersection, the second conduit having a second opening disposed at the first end and a third opening disposed at the second end; a variable flow adjuster body having an outside diameter slightly smaller than the inside diameter of the second conduit such that the variable flow adjuster body is configured and arranged to slide within the second conduit, the variable flow adjuster body having a variable flow adjuster body sidewall with a flow control opening defined therein, the flow control opening configured to rotate into at least one position where a portion of the variable flow adjuster body adjacent to the flow control opening obstructs a portion of the first opening such that a variable size opening between the first conduit and the inside of the variable flow adjuster body is formed, wherein the variable flow adjuster body has a larger diameter section at the top of the variable flow adjuster body forming a shoulder adjacent to the variable flow adjuster body sidewall, the shoulder configured and arranged to rest on the first end of the second conduit when the variable flow adjuster body is inserted into the second conduit, wherein the larger diameter section has a plurality of tabs extending therefrom, each tab corresponding to a flow control setting; a handle assembly extending from the variable flow adjuster body and configured and arranged to control insertion of the variable flow adjuster body into the second conduit and to control removal from the second conduit and rotation relative thereto; and, wherein the variable flow adjuster body is configured and arranged to be inserted into the second conduit until the larger diameter section engages with the first end of the second conduit and rotation of the variable flow adjuster body relative to the second conduit causes the flow control opening in the variable flow adjuster body to adjust the variable size opening to control a flow between the first conduit and the inside of the variable flow adjuster body.

7. The grease interceptor system of claim 6, wherein the second conduit has at least one projection extending from an outer surface, the projection configured to engage with one of the plurality of tabs.

8. The grease interceptor system of claim 6, wherein the handle assembly is removably attached to the variable flow adjuster body.

9. The grease interceptor system of claim 6, the handle assembly being elongate.

10. A grease interceptor system, comprising: a grease interceptor body having an inlet, an outlet, a bottom wall, at least one grease interceptor body sidewall, a top wall, and at least one opening in the top wall; a first conduit disposed in fluid communication with the inlet, the first conduit extending into the grease interceptor body, the first conduit disposed in fluid communication with a second conduit having a first end and a second end disposed opposite from the first end, the second conduit having a first opening in a second conduit sidewall, the first opening having a diameter approximately equal to an outside diameter of the first conduit such that a continuous passageway from the inside of the first conduit to the inside of the second conduit is formed, the second conduit having a second opening disposed at the first end and a third opening disposed at the second end; and, a variable flow adjuster body having an outside diameter slightly smaller than the inside diameter of the second conduit such that the variable flow adjuster body is configured and arranged to fit inside the second conduit, the variable flow adjuster body having a variable flow adjuster body sidewall with a flow control opening defined therein, the flow control opening configured and arranged to rotate into at least one position where a portion of the variable flow adjuster body adjacent to the flow control opening obstructs a portion of the first opening such that a variable size opening between the first conduit and the inside of the variable flow adjuster body is formed, wherein the variable flow adjuster body has a larger diameter section at the top of the variable flow adjuster body forming a shoulder adjacent to the variable flow adjuster body sidewall, the shoulder configured and arranged to rest on the first end of the second conduit when the variable flow adjuster body is inserted into the second conduit, wherein the larger diameter section has a plurality of tabs extending therefrom, each tab corresponding to a flow control setting.

11. The grease interceptor system of claim 10, wherein the second conduit has at least one projection extending from an outer surface.

12. The grease interceptor system of claim 10, wherein a handle assembly extends from the variable flow adjuster body.

13. The grease interceptor system of claim 12, wherein the handle assembly is elongate.

14. The grease interceptor system of claim 10, wherein the variable flow adjuster body is configured and arranged to rotate until the at least one tab engages with the projection on the outer surface of the second conduit.

\* \* \* \* \*